Dec. 23, 1958 J. N. MASON 2,865,047
PROCESS AND APPARATUS FOR MOLDING MATS
Filed Nov. 3, 1955

INVENTOR.
James N. Mason
BY
Henway, Jenney, Witter Hildreth
Attys

United States Patent Office 2,865,047
Patented Dec. 23, 1958

2,865,047

PROCESS AND APPARATUS FOR MOLDING MATS

James N. Mason, Winchester, Mass., assignor, by mesne assignments, to American Biltrite Rubber Company, Inc., a corporation of Delaware Application November 3, 1955, Serial No. 544,650

2 Claims. (Cl. 18—6)

This invention comprises a novel continuous process of molding and curing or vulcanizing individual mats or similar articles of compounds of rubber or plastic. The term "elastomeric" is used generically herein to indicate and designate moldable rubber compounds as well as compounds of thermoplastic or thermosetting resins.

The invention also includes within its scope new and improved apparatus by which the process may be advantageously carried out.

Mats of the general type produced in accordance with the present invention have been heretofore molded and cured in a long continuous sheet of matting material of suitable width and then cut out by the use of a die to the shape desired of the individual mat. This procedure has the disadvantage of leaving a cut edge on the mat, and since the mat is cut from a sheet having uniform surface texture, the individual mat has necessarily the same texture and surface pattern throughout its entire area. This is a serious disadvantage because it is generally desirable to have a border pattern of different configuration from the main body of the mat.

Alternatively the individual mats have been formed and cured in molds operated in a press in an intermittent cycle of closing, heating, cooling and opening. While a completed molded edge mat is secured in this manner, the procedure is comparatively slow and costly and not adapted for automatic handling of the molded articles.

The process of the present invention comprises the steps of pressing upon a heated cylinder a series of blanks of unvulcanized elastomeric compound confined in a connected chain of molds which are open toward the cylinder and wrapped about its surface, and rotating the cylinder with the confined blanks in contact therewith thus molding and vulcanizing the blanks and at the same time imparting to them any desired surface pattern with molded instead of cut border.

The preferred apparatus for carrying out the process of the invention includes a heated cylinder in combination with a steel tension band which is led about the arcuate surface of the cylinder and a flexible molding band provided with a multiplicity of molding cavities and arranged to be passed about the arcuate surface of the heated cylinder while maintained under pressure by the steel tension band. The mold cavities may be filled automatically as they pass to the bite of the tension band and cylinder. The molding and curing or vulcanizing operations are effected in the passage of the molds about the cylinder and the completed mats are stripped from the cylinder after their circuit has been completed.

It will be apparent that the continuous process above outlined and the apparatus employed are effective to produce mats of any desired surface and border pattern rapidly and accurately at a low labor cost while preserving all the advantages of prior technique and contributing advantages of very substantial value.

These and other features of the invention will be best understood and appreciated from the following description of preferred apparatus for carrying out the novel process, the apparatus being selected for purposes of illustration and shown in the accompanying drawings in which.

Figure 1:
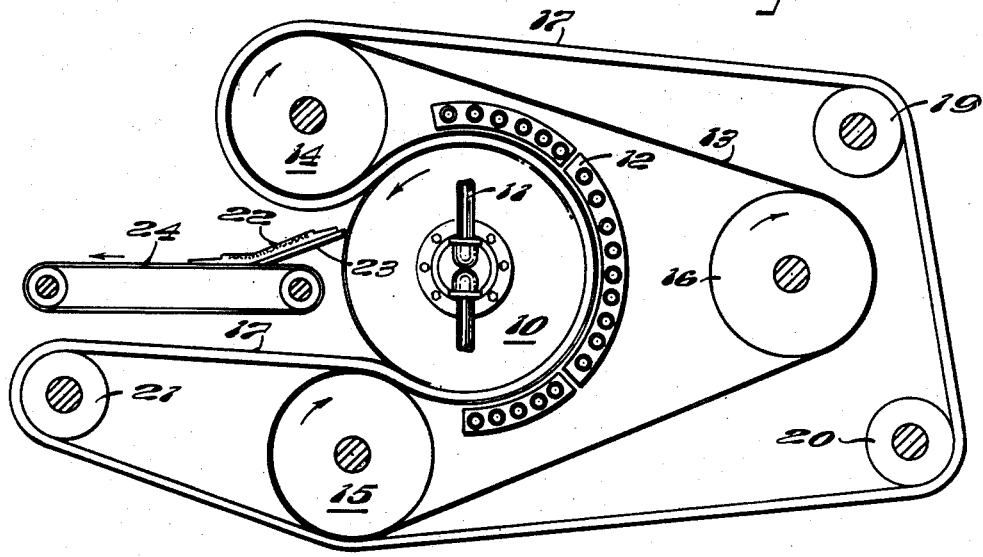
Fig. 1 is a diagrammatic representation in side elevation.
Figure 2:
Fig. 2 is a fragmentary view in cross-section of the mold chain.

The apparatus herein shown and described is of the well-known "Rotocure" type including a large cylinder 10 rotatable about a horizontal axis and heated by steam connections 11 and an arcuate steam jacket 12. A steel tension band 13 is led about a roughly triangular path by drums 14, 15 and 16. The band is directed about a substantially arcuate area of the cylinder 10 and maintained continuously under high tension by outward pressure against the bearings of the drum 16. The structure of the apparatus up to this point is disclosed in greater detail in United States Letters Patent No. 2,110,076, March 1, 1938, Bierer.

In organizing the apparatus for carrying out the process of the present invention a chain of molds in the form of a mold carrying band 17 having a series of spaced mold cavities 18 is employed. This band is guided in a horizontal path to the cylinder 10 at the bite between the cylinder and the tension band 13, then about the cylinder beneath the tension band and then deflected from the cylinder by the drum 14, thereafter travelling above or outside the tension band. In leaving the drum 14 the mold band 17 parts company from the tension band 13 and is guided over drums 19, 20 and 21 back to the starting point. It is deflected somewhat in passing over the drum 15 and in general follows a path outside the path of the tension band 13 except in passing about the arcuate surface of the cylinder 10.

Figure 3:
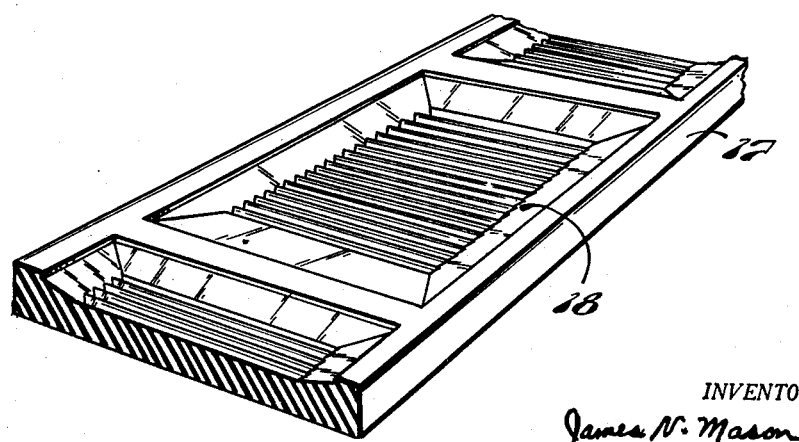
Fig. 3 is a corresponding fragmentary view in perspective of the same.

The mold band is preferably constructed of moderately hard rubber or the rubber and fabric composition of steam hose. It is very tough, slightly elastic and adapted to withstand for a long period the heat and pressure to which it is subjected during the molding and curing operation. The mold cavities 18 may be of any desired shape and design and as herein shown the bed of the mold is formed as an ornamental pattern in relief, specifically a pattern of transverse corrugations. The mold cavity shown in Fig. 3 is designed to produce a mat having a uniformly corrugated rectangular body with a tapering marginal flange on each of its four sides. The horizontal portion of the path of the mold band between the drum 21 and the drum 15 conveniently presents the mold cavities in position to receive a charge or slug of the raw elastomeric composition from which each mat is formed. As stated above each cavity receives its charge as it is moved in this horizontal path in approaching the bite of the tension band and cylinder. The machine is driven through the shaft of the drum 14, the cylinder 10 and the other drums being rotated by the driving action of the tension band 13. The filled mold cavities 18 pass slowly about the arcuate surface of the cylinder under heat and pressure in an interval that is sufficient to cause complete filling of the mold cavities and curing or vulcanizing of the molded mat while in direct contact with the hot arcuate surface of the cylinder and the contoured mold bottom. As the mold cavities are uncovered when the mold band leaves the cylinder, the molded mats adhere to the surface of the cylinder and are drawn out of the mold cavities. They are then carried by the cylinder to a stripper blade 23, stripped one by one from the cylinder and delivered to a conveyor 24 by which they are removed from the apparatus. In Fig. 1 a molded mat 22 is shown as passing from the stripper blade 23 to the conveyor 24.

While the process of the invention has been described as carried out with the assistance of the illustrated apparatus, the process is not limited thereto but may be carried out by employing the mold band in association with cooperating surfaces which apply heat and pressure thereto during the vulcanizing or curing interval and then separate in such manner as to leave the molded mat to be drawn out of the mold cavities by one or the other of the operating surfaces by adherence thereto.

Having thus disclosed a preferred embodiment of the invention, I claim as new and desire to secure by Letters Patent:

1. A machine for molding separate mats of elastomeric compound, comprising a rotary heated cylinder, a mold band having a series of spaced rectangular mold cavities each bounded by a tapering marginal flange, a tension pressure band encircling an arcuate portion of the cylinder, means for guiding the mold band to the bite of the tension band and cylinder in a horizontal path in which the mold cavities are open upwardly to receive charges of elastomeric compound, the mold cavities being thereafter closed by engagement of the mold band with the cylinder, a drum for deflecting the mold band from the cylinder after its passage thereabout, and means located beyond the said point of deflection for stripping the molded mats one by one from the surface of the cylinder.

2. A process of molding individual mats of elastomeric compound, which comprises the steps of moving in a horizontal path a chain of separate open molds, charging each mold during such movement with a charge of elastomeric compound which becomes adhesive when heated, closing the molds progressively by pressing their open side against a heated moving surface thereby heating the charge and molding it against the contoured mold bottom, stripping the molds from said surface leaving the molded mats adhering thereto, and subsequently stripping the mats one by one from the heated surface.

References Cited in the file of this patent
UNITED STATES PATENTS

| | | |
|---|---|---|
| 558,675 | Dean et al. | Apr. 21, 1896 |
| 2,143,627 | Knowland | Jan. 10, 1937 |
| 2,109,190 | Coffey | Feb. 22, 1938 |
| 2,385,456 | Marcey | Sept. 25, 1945 |
| 2,442,443 | Swallow | June 1, 1948 |
| 2,446,771 | Knowland | Aug. 10, 1948 |
| 2,616,125 | Colombo | Nov. 4, 1952 |
| 2,663,052 | Goulding et al. | Dec. 22, 1953 |